(12) United States Patent
Matsuoka

(10) Patent No.: US 10,968,996 B2
(45) Date of Patent: Apr. 6, 2021

(54) TORQUE CONVERTER HAVING CENTRIFUGAL CLUTCH

(71) Applicant: EXEDY Corporation, Neyagawa (JP)

(72) Inventor: Yoshihiro Matsuoka, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 16/727,224

(22) Filed: Dec. 26, 2019

(65) Prior Publication Data
US 2020/0292043 A1  Sep. 17, 2020

(30) Foreign Application Priority Data
Mar. 11, 2019 (JP) .............................. JP2019-043499

(51) Int. Cl.
*F16H 45/02* (2006.01)
*F16D 43/18* (2006.01)

(52) U.S. Cl.
CPC .............. *F16H 45/02* (2013.01); *F16D 43/18* (2013.01); *F16H 2045/0263* (2013.01); *F16H 2045/0278* (2013.01)

(58) Field of Classification Search
CPC .. F16H 45/02–2045/0294; F16D 47/00; F16D 43/04–43/18
See application file for complete search history.

(56) References Cited

U.S. PATENT DOCUMENTS

| 4,042,083 A | * | 8/1977 | Schulz | ................. | F16H 61/141 |
| | | | | | 192/3.31 |
| 2004/0139742 A1 | | 7/2004 | Makita et al. | | |
| 2007/0296295 A1 | * | 12/2007 | Cruz | .................... | H02K 49/106 |
| | | | | | 310/103 |

(Continued)

FOREIGN PATENT DOCUMENTS

| DE | 3917986 C1 | * | 8/1990 | ............. F16D 43/18 |
| JP | S55-78851 A | | 6/1980 | |
| JP | S61-031731 A | | 2/1986 | |

(Continued)

OTHER PUBLICATIONS

Extended European Patent Application of the corresponding European Application No. 20155719.6, dated Aug. 27, 2020, 7 pp.

*Primary Examiner* — Ernesto A Suarez
*Assistant Examiner* — Lillian T Nguyen
(74) *Attorney, Agent, or Firm* — United IP Counselors, LLC

(57) ABSTRACT

A torque converter includes a front cover to which a power is inputted, an impeller coupled to the front cover, a turbine from which the power is outputted, a stator and a centrifugal clutch. The impeller forms a hydraulic oil chamber together with the front cover. The impeller includes an impeller core. The turbine is opposed to the impeller. The turbine includes a turbine core. The stator is disposed between an inner peripheral part of the impeller and an inner peripheral part of the turbine. The stator is configured to regulate a hydraulic oil flowing from the turbine to the impeller. The cen- (Continued)

trifugal clutch is disposed in a space between the impeller core and the turbine core. The centrifugal clutch is configured to directly transmit the power from the impeller to the turbine when a rotational speed of the turbine is greater than or equal to a predetermined value.

6 Claims, 3 Drawing Sheets

(56) References Cited

U.S. PATENT DOCUMENTS

| | | | |
|---|---|---|---|
| 2011/0311367 A1* | 12/2011 | Shiomura | F16H 41/26 |
| | | | 416/223 R |
| 2018/0283515 A1* | 10/2018 | Depraete | F16H 45/02 |

FOREIGN PATENT DOCUMENTS

| | | |
|---|---|---|
| JP | 2004-150597 A | 5/2004 |
| JP | 2004-156675 A | 6/2004 |
| JP | 2006-273297 A | 10/2006 |

\* cited by examiner

TORQUE CONVERTER HAVING CENTRIFUGAL CLUTCH

CROSS-REFERENCE TO RELATED APPLICATIONS

This application claims priority to Japanese Patent Application No. 2019-043499, filed Mar. 11, 2019. The contents of that application are incorporated by reference herein in their entirety.

TECHNICAL FIELD

The present invention relates to a torque converter.

BACKGROUND ART

A torque converter is equipped with a lock-up device in order to reduce fuel consumption. The lock-up device is disposed between a front cover and a turbine and mechanically couples the front cover and the turbine in order to directly transmit a torque therebetween.

A lock-up device described in Japan Laid-open Patent Application Publication No. S61-31731 has been proposed as this type of lock-up device. In this lock-up device, a clutch plate having a disc shape is provided between a front cover and a turbine, and a centrifugal clutch, including a ring member and a shoe assembly, is provided on an outer peripheral part of the clutch plate.

On the other hand, Japan Laid-open Patent Application Publication No. S55-78851 describes a configuration, albeit not related to a lock-up device, that a centrifugal clutch is provided inside a fluid chamber of a torque converter in order to connect and disconnect a principal impeller and an auxiliary impeller to and from each other.

In the torque converter described in Japan Laid-open Patent Application Publication No. S61-31731, a lock-up device is disposed axially between the front cover and the turbine, and furthermore, shoes are pressed onto the inner surface of an outer peripheral part of the front cover. Because of this, it is required to form a space occupied by the centrifugal clutch in both axial and radial directions of the torque converter. Therefore, this hinders compactness in size of the torque converter.

BRIEF SUMMARY

It is an object of the present invention to realize compactness in device size for a torque converter including a lock-up device using a centrifugal clutch.

(1) A torque converter according to the present invention includes a front cover, to which a power is inputted, an impeller, a turbine, a stator and a centrifugal clutch. The impeller is coupled to the front cover, forms a hydraulic oil chamber together with the front cover, and includes an impeller core. The turbine, from which the power is outputted, is provided in opposition to the impeller and includes a turbine core. The stator is disposed between an inner peripheral part of the impeller and an inner peripheral part of the turbine, and regulates a flow of a hydraulic oil flowing from the turbine to the impeller. The centrifugal clutch is disposed in a space between the impeller core and the turbine core, and directly transmits the power from the impeller to the turbine when a rotational speed of the turbine is greater than or equal to a predetermined value.

In this torque converter, the centrifugal clutch is disposed in the space between the impeller core and the turbine core. Additionally, when the rotational speed of the turbine gets higher, the centrifugal clutch is actuated whereby the power is directly transmitted from the impeller to the turbine.

Here, the centrifugal clutch is disposed in a dead space inside a torus of the torque converter. Hence, while the torque converter is kept compact, the centrifugal clutch can be installed in the torque converter.

(2) Preferably, the impeller core includes a friction surface having an annular shape. Besides preferably, the centrifugal clutch includes a centrifugal element that is supported by the turbine core while being radially movable and non-rotatable relative thereto. The centrifugal element is pressed onto the friction surface by a centrifugal force acting thereon in rotation of the turbine.

Here, the friction surface is provided by utilizing the impeller core, and transmission of power is made when the centrifugal element, coupled to the turbine core, is pressed onto the friction surface.

(3) Preferably, the centrifugal element includes a magnet. In this case, when the impeller core is made of, for instance, ferromagnetic material such as iron, the centrifugal element is pressed onto the friction surface not only by the centrifugal force but also by a magnetic force. Because of this, a clutch capacity can be increased.

(4) Preferably, the torque converter further includes a holding member that is disposed radially inside the centrifugal element and is capable of attracting the magnet of the centrifugal element. Besides, the centrifugal element is separated from the friction surface of the impeller core while held by the holding member when the rotational speed of the turbine is less than the predetermined value.

Here, when the centrifugal clutch is in a clutch-off state (when transmission of power is not being made), the centrifugal element is held by the holding member due to a magnetic force. In other words, a return force of the centrifugal element is obtained not by a spring element but by the magnet functioning as a weight. Because of this, the torque converter is simplified in structure.

(5) Preferably, the holding member includes a restriction portion restricting axial movement of the centrifugal element.

(6) Preferably, the turbine core includes a holding surface having an annular shape. The holding surface is disposed radially inside the friction surface of the impeller core while the centrifugal element is interposed therebetween. Besides, the holding member is a holding band having an annular shape. The holding band is made of iron, and is provided on the holding surface as an outer peripheral surface of the turbine core.

(7) Preferably, each of the impeller core and the turbine core is made of a non-magnetic material. The magnetic force of the centrifugal element is herein directed to only the holding band made of iron. Hence, weakening of the magnetic force can be inhibited.

(8) Preferably, the centrifugal element includes a friction material on an outer peripheral surface thereof. In this case, a friction force (torque transmission capacity) can be easily adjusted by variously changing the friction material.

(9) Preferably, the torque converter further includes an auxiliary clutch directly transmitting the power from the front cover to the turbine.

Here, when a heretofore well-known pressure differential clutch is used as the auxiliary clutch, it is possible to lower a hydraulic pressure for actuating the clutch. On the other hand, when a mechanical clutch such as a centrifugal clutch is used as the auxiliary clutch, it is not required to provide a hydraulic pump for actuating the clutch.

(10) Preferably, the turbine core includes first and second engaging portions. The first and second engaging portions are provided thereon so as to be separated from both circumferential ends of the centrifugal element. Besides preferably, the torque converter further includes elastic members. The elastic members are disposed between the centrifugal element and the first and second engaging portions, and elastically couple the centrifugal element and the turbine core in a rotational direction.

Overall, according to the present invention described above, it is possible to realize compactness in device size for a torque converter including a lock-up device using a centrifugal clutch.

DETAILED DESCRIPTION

Figure 1:
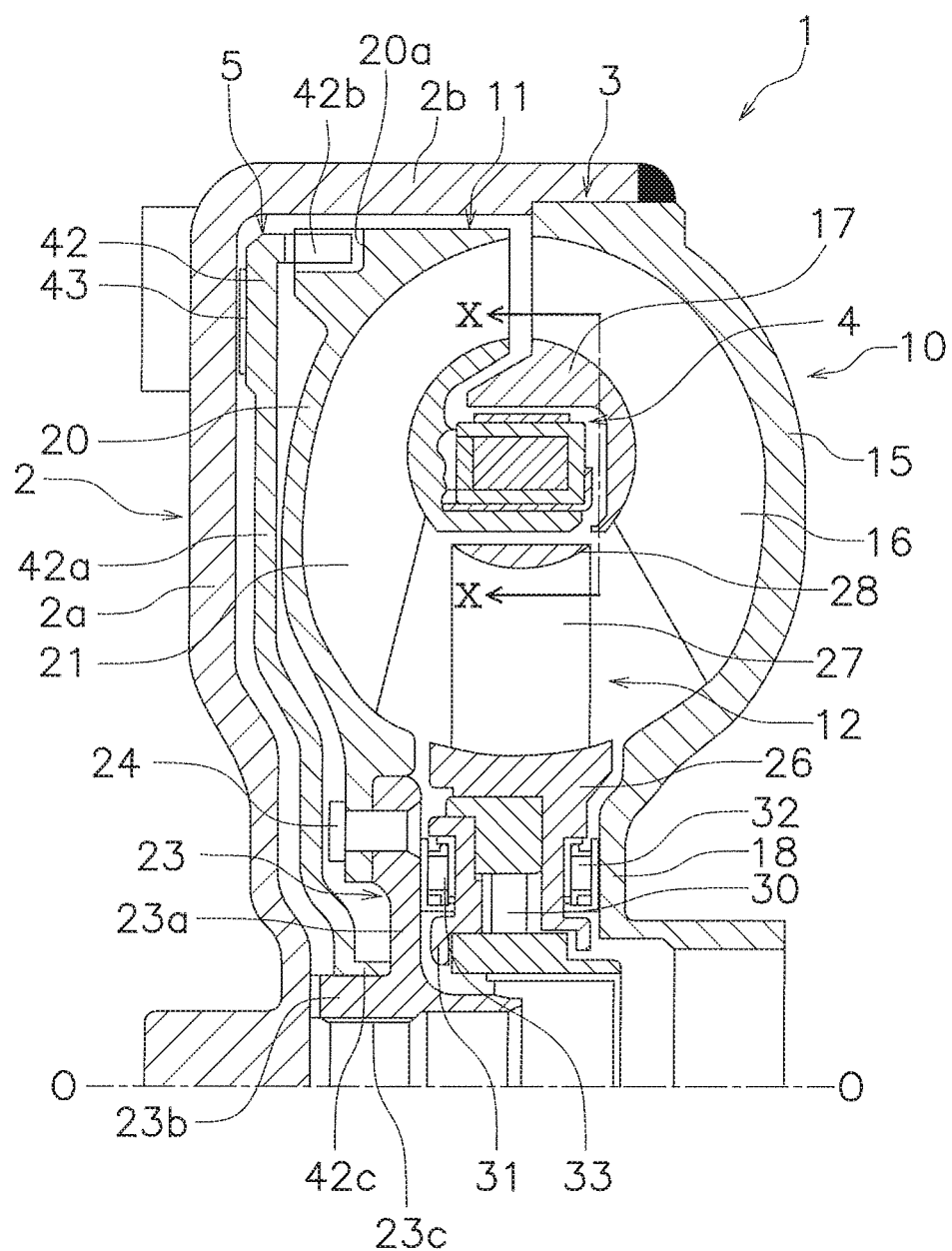
FIG. 1 is a cross-sectional view of a torque converter according to a preferred embodiment of the present invention.
Figure 2:
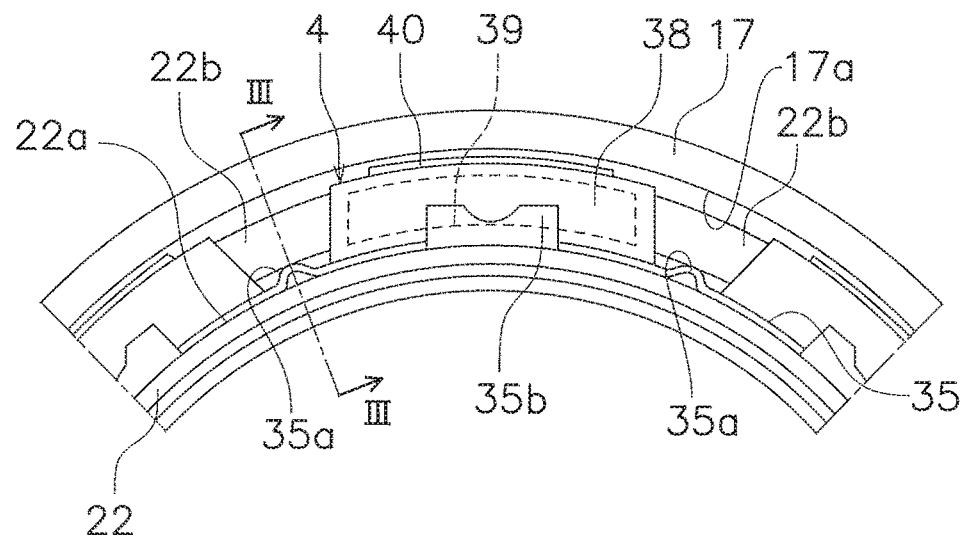
FIG. 2 is a view of FIG. 1 as seen in a direction indicated by arrow X.

FIG. 1 is a partial cross-sectional view of a torque converter 1 according to a preferred embodiment of the present invention. On the other hand, FIG. 2 is a view of FIG. 1 as seen in a direction indicated by arrow X. In FIG. 1, an electric motor (not shown in the drawing) exemplified as a drive source is disposed on the left side, whereas a transmission (not shown in the drawing) is disposed on the right side. It should be noted that line O-O depicted in FIG. 1 is a rotational axis of the torque converter 1. It should be also noted that in the following explanation, the term "radial direction" is defined as a direction separating from the rotational axis, whereas the term "axial direction" is defined as a direction arranged along the rotational axis.

[Entire Configuration of Torque Converter 1]

The torque converter 1 is a device for transmitting a torque from the electric motor to an input shaft (not shown in the drawing) of the transmission. As shown in FIG. 1, the torque converter 1 includes a front cover 2, a torque converter body 3, a centrifugal clutch 4 and an auxiliary clutch 5.

The front cover 2 includes a disc portion 2a and an outer peripheral tubular portion 2b. The outer peripheral tubular portion 2b is shaped to extend from the outer peripheral part of the disc portion 2a toward the transmission. An impeller 10 (to be described) is fixed to the distal end of the outer peripheral tubular portion 2b by welding. As a result, a hydraulic oil chamber, the interior of which is filled with hydraulic oil, is formed by the front cover 2 and the impeller 10.

[Torque Converter Body 3]

The torque converter body 3 includes the impeller 10, a turbine 11 and a stator 12.

The impeller 10 includes an impeller shell 15, a plurality of impeller blades 16, an impeller core 17 and an impeller hub 18.

The outer peripheral part of the impeller shell 15 extends toward the front cover 2, and as described above, the distal end thereof is fixed to the outer peripheral tubular portion 2b of the front cover 2 by welding. The plural impeller blades 16 are fixed to the interior of the impeller shell 15. The impeller core 17 has an annular shape and supports the turbine-side ends of the plural impeller blades 16. It should be noted that the impeller core 17 will be described below in detail. The impeller hub 18 is provided in the inner peripheral part of the impeller shell 15, and extends toward the transmission.

The turbine 11 includes a turbine shell 20, a plurality of turbine blades 21, a turbine core 22 and a turbine hub 23.

The turbine shell 20 is an annular member, and the inner peripheral part thereof extends toward the turbine hub 23. The turbine shell 20 is provided with a plurality of engaging recesses 20a on the front cover 2-side surface of the outer peripheral end thereof. The plural turbine blades 21 are disposed in opposition to the impeller blades 16, and are fixed to the impeller-side surface of the turbine shell 20. The turbine core 22 has an annular shape and supports the impeller-side ends of the turbine blades 21. It should be noted that the turbine core 22 will be described below in detail. The turbine hub 23 includes a flange portion 23a and a tubular portion 23b. The flange portion 23a has a disc shape. The tubular portion 23b is provided on the inner peripheral end of the flange portion 23a so as to extend in the axial direction. The inner peripheral end of the turbine shell 20 is fixed to the flange portion 23a by at least one rivet 24. Moreover, the tubular portion 23b is provided with a spline hole 23c on the inner peripheral surface thereof, and the transmission-side input shaft can be coupled to the spline hole 23c.

The stator 12 is a mechanism for regulating the flow of the hydraulic oil returning from the turbine 11 to the impeller 10. The stator 12 is an integrated member made of casting of resin, aluminum alloy or so forth. The stator 12 is disposed between the inner peripheral part of the impeller 10 and that of the turbine 11. The stator 12 mainly includes a stator shell 26, a plurality of stator blades 27 and a stator core 28. The stator blades 27 are provided on the outer peripheral surface of the stator shell 26. The stator core 28 has an annular shape and is provided on the distal ends of the plural stator blades 27.

The stator shell 26 is supported by a stationary shaft (not shown in the drawings) through a one-way clutch 30. Additionally, a retainer 31 is disposed on the front cover 2 side of the one-way clutch 30 in the axial direction. The retainer 31 is disposed between the one-way clutch 30 and the flange portion 23a of the turbine hub 23, and holds the one-way clutch 30.

Additionally, a thrust bearing 32 is provided between the impeller hub 18 and the stator shell 26, whereas a thrust bearing 33 is provided between the retainer 31 and the flange portion 23a of the turbine hub 23.

[Impeller Core 17 and Turbine Core 22]

Figure 3:
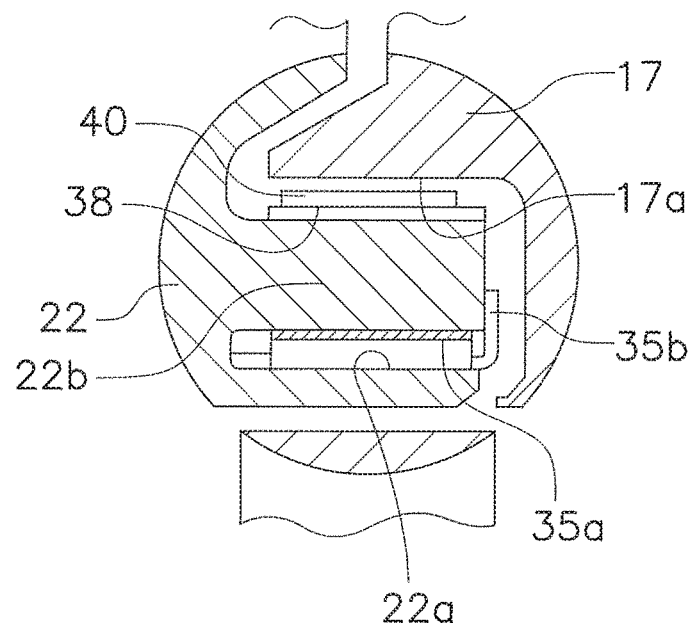
FIG. 3 is a cross-sectional view of FIG. 2 taken along line III-III.

As described above, each of the impeller core 17 and the turbine core 22 has an annular shape. As shown in FIG. 2 and FIG. 3 that is a cross-sectional view of FIG. 2 taken along line an inner peripheral surface 17a of the outer peripheral part of the impeller core 17 is provided as a friction surface having an annular shape. On the other hand, the turbine core 22 includes a holding surface 22a having an annular shape and a plurality of engaging portions 22b. The holding surface 22a, having a curvature radius equal to that of the friction surface 17a of the impeller core 17, is disposed in radial opposition to the friction surface 17a. The plural engaging portions 22b are disposed in circumferential alignment, and are shaped to protrude toward the impeller 10. The impeller core 17 is made of non-magnetic material or ferromagnetic material such as iron. On the other hand, the turbine core 22 is preferably made of non-magnetic material.

A holding band 35 is attached to the outer peripheral surface of the turbine core 22. The holding band 35 is made of iron and has an annular shape. The holding band 35 includes a plurality of elastically deforming portions 35a and a plurality of restriction pawls 35b. The elastically deforming portions 35a are provided at predetermined intervals in the circumferential direction, and likewise, the restriction pawls 35b are provided at predetermined intervals in the circumferential direction. The elastically deforming portions 35a and the restriction pawls 35b are alternately provided in the circumferential direction.

Each elastically deforming portion 35a is made approximately in the shape of U that protrudes radially outward. When the elastically deforming portions 35a are elastically deformed in the circumferential direction, the holding band 35 can be expanded in diameter. Therefore, the holding band 35, when attached to the outer peripheral surface 22a of the turbine core 22 while expanded in diameter, can be press-fitted and fixed thereto.

The restriction pawls 35b are formed by bending the impeller 10-side distal end of the holding band 35 radially outward. The restriction pawls 35b restrict centrifugal elements (to be described) from axially moving, respectively.

[Centrifugal Clutch 4]

The centrifugal clutch 4 is composed of the friction surface 17a of the impeller core 17 and a plurality of centrifugal elements 38.

Each of the plural centrifugal elements 38 is disposed circumferentially between adjacent two of the plural engaging portions 22b of the turbine core 22. Each centrifugal element 38 is prohibited from circumferentially moving by the adjacent engaging portions 22b, but is radially movable along one circumferential end surfaces of the adjacent engaging portions 22b. Therefore, the centrifugal elements 38 are rotated together with the turbine core 22, and are moved radially outward by centrifugal forces. Additionally, transmission of power is enabled between the centrifugal elements 38 and the turbine 11 through the engaging portions 22b of the turbine core 22. It should be noted that as described above, the centrifugal elements 38 are restricted from axially moving by the restriction pawls 35b of the holding band 35, respectively.

Each centrifugal element 38 contains a magnet 39 in the interior thereof, and is made of metal or resin. Therefore, the magnet 39 also functions as a weight of each centrifugal element 38. Each of the outer and inner peripheral surfaces of each centrifugal element 38 has a circular-arc shape, and the curvature radius thereof is equal to that of the friction surface 17a of the impeller core 17 and that of the holding surface 22a of the turbine core 22. Additionally, a friction material 40 is fixed to the outer peripheral surface of each centrifugal element 38. Each centrifugal element 38 includes the magnet 39 in the interior thereof, and hence, is magnetically attracted to and held by the holding band 35 when the turbine 11 is stopped or when a centrifugal force acting on each centrifugal element 38 is small in magnitude. In a condition that each centrifugal element 38 is held by the holding band 35, a gap is produced between the friction material 40 fixed to the outer peripheral surface of each centrifugal element 38 and the friction surface 17a of the impeller core 17.

[Auxiliary Clutch 5]

The auxiliary clutch 5 includes a piston 42 disposed between the front cover 2 and the turbine 11.

The piston 42 includes a disc portion 42a, a plurality of outer peripheral engaging portions 42b and an inner peripheral tubular portion 42c. The disc portion 42a is shaped approximately along the front cover 2. The disc portion 42a is provided with a friction member 43 fixed to the front cover 2-side surface of the outer peripheral part thereof. The plural outer peripheral engaging portions 42b protrude from the outer peripheral end of the disc portion 42a toward the turbine 11, and are provided at predetermined intervals in the circumferential direction. The outer peripheral engaging portions 42b are engaged with the plural engaging recesses 20a provided on the outer peripheral part of the turbine shell 20. The inner peripheral tubular portion 42c is provided on the inner peripheral end of the disc portion 42a so as to protrude toward the impeller 10. The inner peripheral tubular portion 42c is supported by the outer peripheral surface of the tubular portion 23b of the turbine hub 23, while being axially movable.

The auxiliary clutch 5 is axially movable by difference in pressure of hydraulic oil between the front cover 2 side and the turbine side 11 of the piston 42. When the friction member 43 fixed to the piston 42 is pressed onto the lateral surface of the front cover 2 by the difference in pressure of hydraulic oil, power is transmitted from the front cover 2 to the turbine 11 through the piston 42.

[Action]

The centrifugal clutch 4 is not actuated in a condition that the turbine 11 is not being rotated or is rotated at a low speed. In other words, each centrifugal element 38 is held by the holding band 35 due to a magnetic force of the magnet 39 contained therein, and a gap is maintained between the outer peripheral surface of each centrifugal element 38 including the friction material 40 and the friction surface 17a of the impeller core 17.

On the other hand, the auxiliary clutch 5, employing a pressure differential type, is not actuated as well, whereby the piston 42 is separated from the front cover 2.

In such a lock-up off state as described above, the hydraulic oil flows from the impeller 10 to the turbine 11 and further flows to the impeller 10 through the stator 12 in the interior of the torque converter body 3. Accordingly, power is transmitted from the impeller 10 to the turbine 11 through the hydraulic oil. The power transmitted to the turbine 11 is then transmitted to the input shaft of the transmission through the turbine hub 23.

When the speed ratio of the torque converter 1 is increased and the rotational speed of the turbine 11 reaches a predetermined speed or greater, a centrifugal force acting on each centrifugal element 38 becomes greater than a holding force of the holding band 35 holding each centrifugal element 38 (the magnetic force of the magnet 39). Because of this, each centrifugal element 38 is moved radially outward, and the friction material 40 fixed to each centrifugal element 38 is pressed onto the friction surface 17a of the impeller core 17. In other words, the centrifugal clutch 4 is turned to a clutch-on state.

In this case, power is directly transmitted from the impeller core 17 of the impeller 10 to the turbine core 22 (i.e., the turbine 11) through the centrifugal elements 38 without through the hydraulic oil. As described above, the power transmitted to the turbine 11 is then transmitted to the input shaft of the transmission through the turbine hub 23.

On the other hand, the piston 42 is moved toward the front cover 2 by difference in pressure of hydraulic oil between the both sides of the piston 42, and the friction member 43 fixed to the piston 42 is pressed onto the front cover 2. Because of this, power is transmitted from the front cover 2 to the turbine hub 23 through the centrifugal clutch 4, and is also transmitted to the turbine hub 23 through the auxiliary clutch 5.

Now it is assumed that the impeller core 17 is made of, for instance, ferromagnetic material such as iron. When each centrifugal element 38 is herein moved radially outward so as to be separated from the holding band 35 and is disposed in adjacent to or pressed onto the impeller core 17, the magnetic force of the magnet 39 in each centrifugal element 38 acts in a direction opposite to the direction of the holding force. In other words, each centrifugal element 38 is pressed onto the friction surface 17a not only by the centrifugal force but also by the magnetic force.

By contrast, when it is assumed that the impeller core 17 is made of non-magnetic material, the magnetic force does not act as a force for pressing each centrifugal element 38 onto the friction surface 17a. However, the magnetic force is directed to only the holding band 35. Hence, the holding force can be strengthened.

Other Preferred Embodiments

The present invention is not limited to the preferred embodiment described above, and a variety of changes or modifications can be made without departing from the scope of the present invention.

(a) In the aforementioned preferred embodiment, the pressure differential clutch is provided as the auxiliary clutch. However, instead of this, a centrifugal clutch can be provided as the auxiliary clutch. In this case, it is not required to provide a hydraulic pump for actuating the auxiliary clutch.

Figure 4:
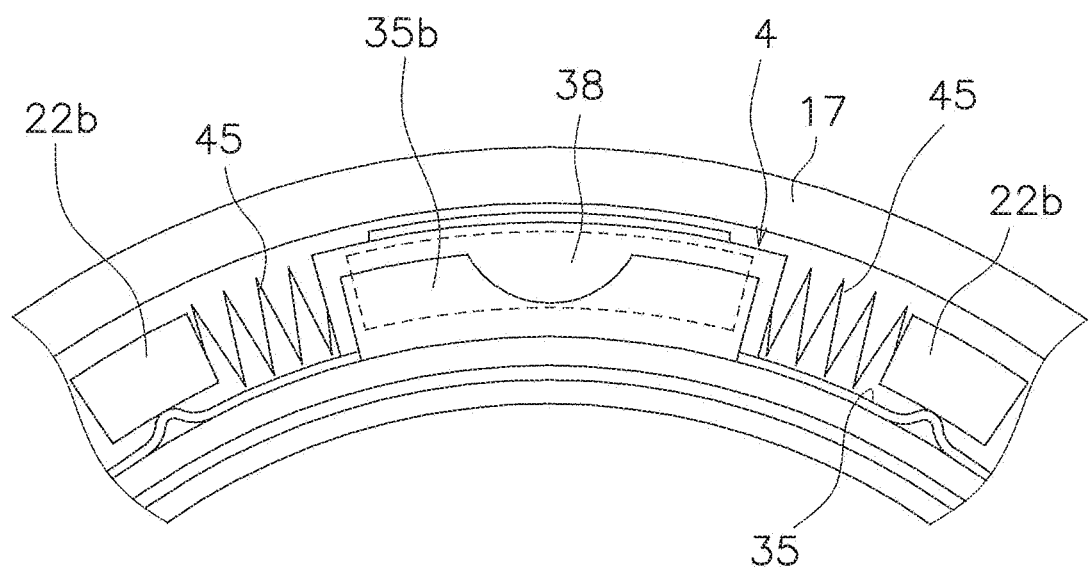
FIG. 4 is a diagram corresponding to FIG. 2 in another preferred embodiment of the present invention.

(b) In the aforementioned preferred embodiment, power is configured to be transmitted by direct contact between the centrifugal elements 38 and the engaging portions 22b of the turbine core 22. However, as shown in FIG. 4, elastic members 45 such as springs can be provided between the centrifugal elements 38 and the engaging portions 22b. In this case, each centrifugal element 38 is configured to be radially moved along each restriction pawl 35b of the holding band 35. In other words, each restriction pawl 35b is configured to function as a radial guide for each centrifugal element 38 as well. Similarly to the aforementioned preferred embodiment, the preferred embodiment herein described can also enhance vibration attenuation performance.

REFERENCE SIGNS LIST

1 Torque converter
2 Front cover
4 Centrifugal clutch
5 Auxiliary clutch
10 Impeller
11 Turbine
12 Stator
17 Impeller core
17a Friction surface
22 Turbine core
22a Holding surface
22b Engaging portion
35 Holding band
35b Restriction pawl
38 Centrifugal element
39 Magnet
40 Friction material

What is claimed is:

1. A torque converter comprising:
a front cover to which a power is inputted;
an impeller coupled to the front cover, the impeller forming a hydraulic oil chamber together with the front cover, the impeller including an impeller core;
a turbine from which the power is outputted, the turbine opposed to the impeller, the turbine including a turbine core;
a stator disposed between an inner peripheral part of the impeller and an inner peripheral part of the turbine, the stator configured to regulate a flow of a hydraulic oil flowing from the turbine to the impeller;
a centrifugal clutch including a centrifugal element, the centrifugal clutch disposed in a space between the impeller core and the turbine core, the centrifugal clutch configured to directly transmit the power from the impeller to the turbine when a rotational speed of the turbine is greater than or equal to a predetermined value; and
a holding member disposed radially inside the centrifugal element, wherein
the impeller core includes a friction surface having an annular shape,
the centrifugal element is supported by the turbine core, the centrifugal element being radially movable and non-rotatable relative to the turbine core, the centrifugal element pressed onto the friction surface by a centrifugal force acting thereon in rotation of the turbine,
the centrifugal element includes a magnet,
the holding member is configured to attract the magnet of the centrifugal element,
the centrifugal element is separated from the friction surface of the impeller core in a state of being held by the holding member when the rotational speed of the turbine is less than the predetermined value,
the turbine core includes a holding surface having an annular shape, the holding surface disposed radially inside the friction surface of the impeller core in a state in which the centrifugal element is interposed therebetween, and
the holding member is a holding band having an annular shape, the holding band made of iron, the holding band provided on the holding surface as an outer peripheral surface of the turbine core.

2. The torque converter according to claim 1, wherein the holding member includes a restriction portion, the restriction portion configured to restrict axial movement of the centrifugal element.

3. The torque converter according to claim 1, wherein each of the impeller core and the turbine core is made of a non-magnetic material.

4. The torque converter according to claim 1, wherein the centrifugal element includes a friction material on an outer peripheral surface thereof.

5. The torque converter according to claim 1, further comprising:
an auxiliary clutch configured to directly transmit the power from the front cover to the turbine.

6. A torque converter comprising:
a front cover to which a power is inputted;
an impeller coupled to the front cover, the impeller forming a hydraulic oil chamber together with the front cover, the impeller including an impeller core;

a turbine from which the power is outputted, the turbine opposed to the impeller, the turbine including a turbine core;

a stator disposed between an inner peripheral part of the impeller and an inner peripheral part of the turbine, the stator configured to regulate a flow of a hydraulic oil flowing from the turbine to the impeller;

a centrifugal clutch including a centrifugal element, the centrifugal clutch disposed in a space between the impeller core and the turbine core, the centrifugal clutch configured to directly transmit the power from the impeller to the turbine when a rotational speed of the turbine is greater than or equal to a predetermined value; and elastic members configured to elastically couple the centrifugal element and the turbine core in a rotational direction, wherein the turbine core includes first and second engaging portions, the first and second engaging portions provided thereon so as to be separated from both circumferential ends of the centrifugal element, and the elastic members are disposed between the centrifugal element and the first and second engaging portions.

* * * * *